US012340920B1

(12) United States Patent
McNutt et al.

(10) Patent No.: US 12,340,920 B1
(45) Date of Patent: Jun. 24, 2025

(54) TWISTED PAIR CABLES SUITABLE FOR EXTENDED DISTANCE APPLICATIONS

(71) Applicant: Superior Essex International Inc., Atlanta, GA (US)

(72) Inventors: Christopher W. McNutt, Woodstock, GA (US); Amir Sekhavat, Marietta, GA (US)

(73) Assignee: Superior Essex International Inc., Atlanta, GA (US)

( * ) Notice: Subject to any disclaimer, the term of this patent is extended or adjusted under 35 U.S.C. 154(b) by 0 days.

(21) Appl. No.: 18/211,987

(22) Filed: Jun. 20, 2023

(51) Int. Cl.
*H01B 11/08* (2006.01)
*H01B 11/10* (2006.01)

(52) U.S. Cl.
CPC ............ *H01B 11/08* (2013.01); *H01B 11/10* (2013.01)

(58) Field of Classification Search
CPC ..... H01B 1/02; H01B 3/44; H01B 9/02–9/08; H01B 7/24; H01B 7/34; H01B 7/18; H01B 7/1805; H01B 7/1875; H01B 9/003; H01B 11/02–11/10; H01B 13/04; H01R 4/24; H01R 9/09; H01R 13/648
USPC .................... 174/47, 74 R, 78, 84 R, 95, 96, 174/110 R–120 SR, 102 R, 108, 109; 439/418, 608, 610, 638, 676, 934, 941
See application file for complete search history.

(56) References Cited

U.S. PATENT DOCUMENTS

| | | | | | |
|---|---|---|---|---|---|
| 4,404,424 | A * | 9/1983 | King | H01B 7/0876 | 174/32 |
| 4,413,469 | A * | 11/1983 | Paquin | H01B 7/0876 | 57/204 |
| 4,486,619 | A * | 12/1984 | Trine | H01B 11/02 | 174/34 |
| 5,649,829 | A * | 7/1997 | Miller | H01R 31/005 | 439/76.1 |
| 6,043,434 | A * | 3/2000 | Prudhon | H01B 7/0823 | 174/117 F |
| 6,255,593 | B1 * | 7/2001 | Reede | H01R 13/6463 | 174/76 |
| 6,379,175 | B1 * | 4/2002 | Reede | H01R 13/6477 | 439/418 |
| 6,448,500 | B1 * | 9/2002 | Hosaka | H01B 9/003 | 174/113 R |
| 6,506,077 | B2 * | 1/2003 | Nagel | H01R 13/6474 | 439/607.05 |
| 6,687,437 | B1 * | 2/2004 | Starnes | G02B 6/4416 | 385/101 |

(Continued)

*Primary Examiner* — William H. Mayo, III
(74) *Attorney, Agent, or Firm* — Rhett White

(57) ABSTRACT

A twisted pair cable suitable for extended length applications exceeding 100 m may include an outer jacket and four twisted pairs of individually insulated conductors disposed within the outer jacket. Each of the four twisted pairs may have a respective nominal twist lay along a longitudinal length of the cable with the exception of a first termination area positioned at a first longitudinal end of the cable and a second termination area positioned at a second longitudinal end of the cable opposite the first termination area, where each of the first and second termination areas occupies a longitudinal distance of 15.0 cm or less. Additionally, each of the four twisted pairs may a first twist lay within the first termination area that is smaller than its nominal twist lay and a second twist lay within the second termination area that is smaller than its nominal twist lay.

20 Claims, 6 Drawing Sheets

(56) References Cited

U.S. PATENT DOCUMENTS

| | | | | |
|---|---|---|---|---|
| 7,019,218 | B2 * | 3/2006 | Somers | H01B 11/04<br>174/113 C |
| 9,508,467 | B2 * | 11/2016 | Pon | H01B 9/003 |
| 11,107,605 | B2 * | 8/2021 | Conaty | H01B 13/0036 |
| 11,373,783 | B1 * | 6/2022 | McNutt | H01B 7/28 |
| 2022/0223318 | A1 * | 7/2022 | McNutt | H01R 24/62 |

* cited by examiner

TWISTED PAIR CABLES SUITABLE FOR EXTENDED DISTANCE APPLICATIONS

CROSS-REFERENCE TO RELATED APPLICATIONS

The present application is related to U.S. patent application Ser. No. 18/211,969 filed on Jun. 20, 2023 and entitled "Twisted Pair Cables Suitable for Extended Distance Applications", the contents of which are incorporated by reference herein in its entirety.

TECHNICAL FIELD

Embodiments of the disclosure relate generally to twisted pair cables and, more particularly, to twisted pair cables suitable for transmitting data and/or power over extended distances greater than one hundred meters.

BACKGROUND

Twisted pair cables are commonly utilized to transmit Ethernet and other data signals in accordance with one or more suitable Category cabling standards. In certain applications, twisted pair cables are utilized to provide both data signals and electrical power to various devices, for example, in accordance with a Power over Ethernet ("PoE") standard or protocol. Regardless of the intended application, industry standards limit installation lengths of twisted pair cables to 100 m. However, recent customer expectations have led to an increased desire to install PoE and Category cables at continuous lengths exceeding the industry requirement of 100 m.

Category standards limit installation length to 100 m to ensure the accuracy and fidelity of transmitted data signals. As the cable length extends beyond 100 m, a cable can suffer from bandwidth deterioration, latency issues and slower transmission speeds, signal deterioration, and eventual signal loss. There is often a greater risk of the twisted pair conductors being affected by crosstalk and external interference. Further, as a result of Category cables implementing twisted pairs with different lay lengths, longer cables experience deficiencies in propagation delay and delay skew. Signals propagate faster along pairs with shorter twist lays and, over longer longitudinal lengths, higher amounts of delay skew exist between the various pairs of a cable.

A few twisted pair cables have recently been marketed for use at lengths exceeding 100 m. However, these cables have been targeted at and promoted for use with security camera and lighting applications. The existing cables are not intended for and do not require transmission performance necessary to support sophisticated electronic applications. As the use of extended distance twisted pair cables becomes more popular, the electronics they support will become more sophisticated and have enhanced requirements for signal performance, propagation delay, and delay skew. Accordingly, there is an opportunity for improved twisted pair cables suitable for use at distances exceeding 100 m. Further, there is an opportunity for improved twisted pair cables that optimize propagation delay and/or delay skew at extended distances exceeding 100 m.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
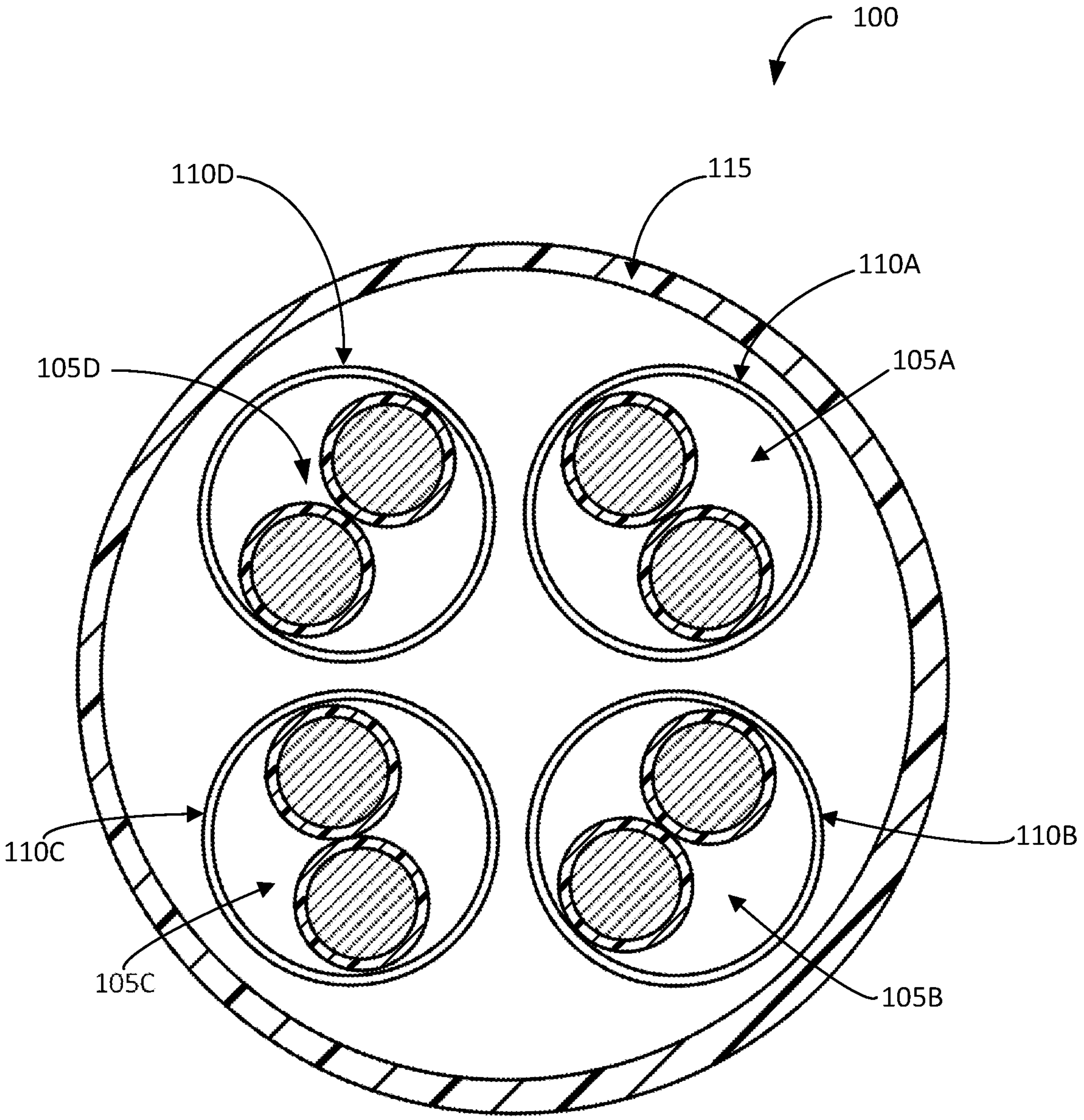
FIGS. 1-3 are cross-sectional views of example twisted pair cables suitable for use at distances greater than 100 m, according to an illustrative embodiment of the disclosure.

For purposes of this disclosure, the term "nominal twist lay" refers to an intended or selected twist lay for a given twisted pair while also permitting relatively minor variations that result from a manufacturing process. Given the equipment and processes utilized to form twisted pairs of conductors, it may be difficult to maintain a twist lay at an exact value over an entire longitudinal length of a cable. Thus, a manufacturing process typically attempts to maintain a twist lay at a desired value plus or minus an acceptable variance, such as five percent or ten percent. With an acceptable variance of ten percent, a nominal twist lay of 25.0 mm may permit a twist lay to fall within a range of 22.5 mm to 27.5 mm.

Various embodiments of the present disclosure are directed to twisted pair cables suitable for extended distance applications having longitudinal lengths exceeding 100 meters. The twisted pair cables may be utilized for a wide variety of suitable applications, such as data transmission and/or Power over Ethernet ("PoE") applications. In certain embodiments, a cable may include at least four twisted pairs of individually insulated conductors. The nominal twist lay lengths of each of the twisted pairs may be optimized to reduce the propagation delay and/or delay skew at extended distances exceeded 100 m. For example, to reduce propagation delay, each of the twisted pairs may have a relatively long nominal twist lay, such as a twist lay of at least approximately 15.0 mm or a twist lay of at least approximately 25.0 mm. These twist lays exceed those commonly used for Category cables, such as Category 5, 5e, 6, and 6A cables. To reduce delay skew, the respective nominal twist lays of each of the twisted pairs may be approximately equal or relatively close to one another. For example, a difference between the respective nominal twist lays of any two of the twisted pairs may be no more than approximately 5.0 mm. As desired, the at least four twisted pairs may be twisted together with a relatively long bunch lay or overall lay, such as a bunch lay that is at least approximately 125 mm.

In certain embodiments, to reduce crosstalk and noise that may negatively impact the electrical performance of the twisted pairs, a respective individual shield layer may be formed around each of the twisted pairs. A wide variety of suitable shield designs may be incorporated into the cable, such as shields that include longitudinally continuous electrically conductive or other shielding material and/or shields that include discontinuous patches of electrically conductive or other shielding material. It has been found that electrical performance may be enhanced if a thickness of the electrically conductive material (e.g., aluminum, copper, etc.) or other shielding material incorporated into a shield is at least approximately 0.0762 mm (approximately 3 mils) or approximately 0.0889 mm (3.5 mils). In various embodiments, a thickness of shielding material may be between approximately 0.0635 mm (2.5 mils) and approximately 0.127 mm (5 mils) or between approximately 0.0762 mm (3 mils) and approximately 0.127 mm (5 mils).

Additionally, to reduce crosstalk and noise at the connectors when the cable is terminated at opposite ends, the respective twisted pairs may each have a tighter twist lay (relative to its nominal twist lay) within relatively small termination areas. For example, each twisted pair may have a respective first termination area positioned at one end of the cable and a respective second termination area positioned at an opposite end of the cable. The first and second termination areas may each have relatively short longitudinal lengths, such as lengths that are less than approximately 15.0 cm (about 5.9 inches). In certain embodiments, the termination areas may have longitudinal lengths of approximately 2.5 cm (1 inch), 7.62 cm (3 inches), or 12.7 cm (5 inches), or a longitudinal length incorporated into a range between any two of the above values. To terminate the cable at a connector (either during manufacture for preconnectorized cables or in the field during installation), the individual shields may be removed from the termination areas. Each of the twisted pairs may have a tighter twist lay within their termination areas relative to their nominal twist lays to reduce crosstalk. Further, in certain embodiments, each of the twisted pairs may have a different twist lay within their respective termination areas.

As a result of incorporating the unique cable constructions and twist lays described herein, a cable may be utilized for extended distance applications exceeding 100 m while also reducing the propagation delay and/or delay skew of the cable. Propagation delay may be reduced as a result of the twisted pairs having relatively long lay lengths, and delay skew may be reduced as a result of the twisted pairs having similar law lengths. In certain embodiments, a delay skew between any two of the twisted pairs (e.g., a difference in the propagation delay between any two of the twisted pairs along a longitudinal length of the cable, etc.) may be less than approximately 45 ns over the operating length of the cable (i.e., over an extended distance greater than 100 m) at 20° C., 40° C., and 60° C. for the operating frequency range of the cable. For example, the delay skew between any two of the twisted pairs may be less than approximately 45 ns over a frequency range between 1.0 MHz and 250 MHz. In certain embodiments, a delay skew between any two of the twisted pairs may be less than approximately 45 ns over a frequency range between 1.0 MHz and 500 MHz. Additionally, a delay skew between any two of the pairs may be within 10 ns of the delay skew between any other two pairs included in the cable. Thus, a twisted pair cable formed in accordance with the present disclosure may be utilized to transmit data signals at relatively high frequencies over extended distances while minimizing propagation delays and skew. As a result, the cable may be utilized in association with sophisticated electronic apparatus over extended distances.

In one example embodiment, a cable may include four twisted pairs of individually insulated conductors, and each of the four twisted pairs may have a nominal twist lay of at least 25.0 mm. A difference between the respective nominal twist lays of any two of the four twisted pairs may be no more than 5.0 mm. Individual twisted pair shield layers may be respectively formed around each of the four twisted pairs, and a jacket may be formed around the twisted pairs and the shield layers. Further, the cable may have a longitudinal length greater than 100 m.

In another example embodiment, a cable may include four twisted pairs of individually insulated conductors, and a difference between the respective nominal twist lays of any two of the four twisted pairs may be no more than 5.0 mm. Individual twisted pair shield layers may be respectively formed around each of the four twisted pairs, and a jacket may be formed around the twisted pairs and the shield layers. Further, the cable may have a longitudinal length greater than 100 m.

In another example embodiment, a cable may include four twisted pairs of individually insulated conductors, and each twisted pair may have a nominal twist lay of at least 25.0 mm. Individual twisted pair shield layers may be respectively formed around each of the four twisted pairs, and a jacket may be formed around the twisted pairs and the shield layers. The cable may have a longitudinal length greater than 100 m, and a delay skew between any two of the four twisted pairs may be less than 45 ns over a frequency range between 1 MHz and 250 MHz.

In yet another example embodiment, a cable may include an outer jacket and four twisted pairs of individually insulated conductors may be disposed within the outer jacket, each of the four twisted pairs having a respective nominal twist lay along a longitudinal length of the cable with the exception of a first termination area positioned at a first longitudinal end of the cable and a second termination area positioned at a second longitudinal end of the cable opposite the first termination area, each of the first and second termination areas occupying a longitudinal distance of 15.0 cm or less. Each of the four twisted pairs may have a first twist lay within the first termination area that is smaller than its nominal twist lay. Each of the four pairs may also have a second twist lay within the second termination area that is smaller than its nominal twist lay. Additionally, the longitudinal length of the cable may be greater than 100 m.

In another example embodiment, a cable may include four twisted pairs of individually insulated conductors, each of the four twisted pairs having a respective nominal twist lay along a longitudinal direction of the cable between a first termination area positioned at a first longitudinal end of the cable and a second termination area positioned at a second longitudinal end of the cable opposite the first termination area. Each of the first and second termination areas may occupy a longitudinal distance of 15.0 cm or less. Each of the four twisted pairs may have a first twist lay within the first termination area that is tighter than its nominal twist lay and a second twist lay within the second termination area that is tighter than its nominal twist lay. Further, a longitudinal length of the cable may be greater than 100 m.

In yet another example embodiment, a cable may include four twisted pairs of individually insulated conductors, each of the four twisted pairs having a respective nominal twist lay of at least 15.0 cm along a longitudinal direction of the cable between a first termination area positioned at a first longitudinal end of the cable and a second termination area positioned at a second longitudinal end of the cable opposite the first termination area, each of the first and second termination areas occupying a longitudinal distance of 15.0 cm or less. Individual twisted pair shield layers may be formed around each of the four twisted pairs, and a jacket may be formed around the twisted pairs and the shield layers. Additionally, each of the four twisted pairs may have a first twist lay within the first termination area that is tighter than its nominal twist lay and a second twist lay within the second termination area that is tighter than its nominal twist lay. Further, a longitudinal length of the cable may be greater than 100 m.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
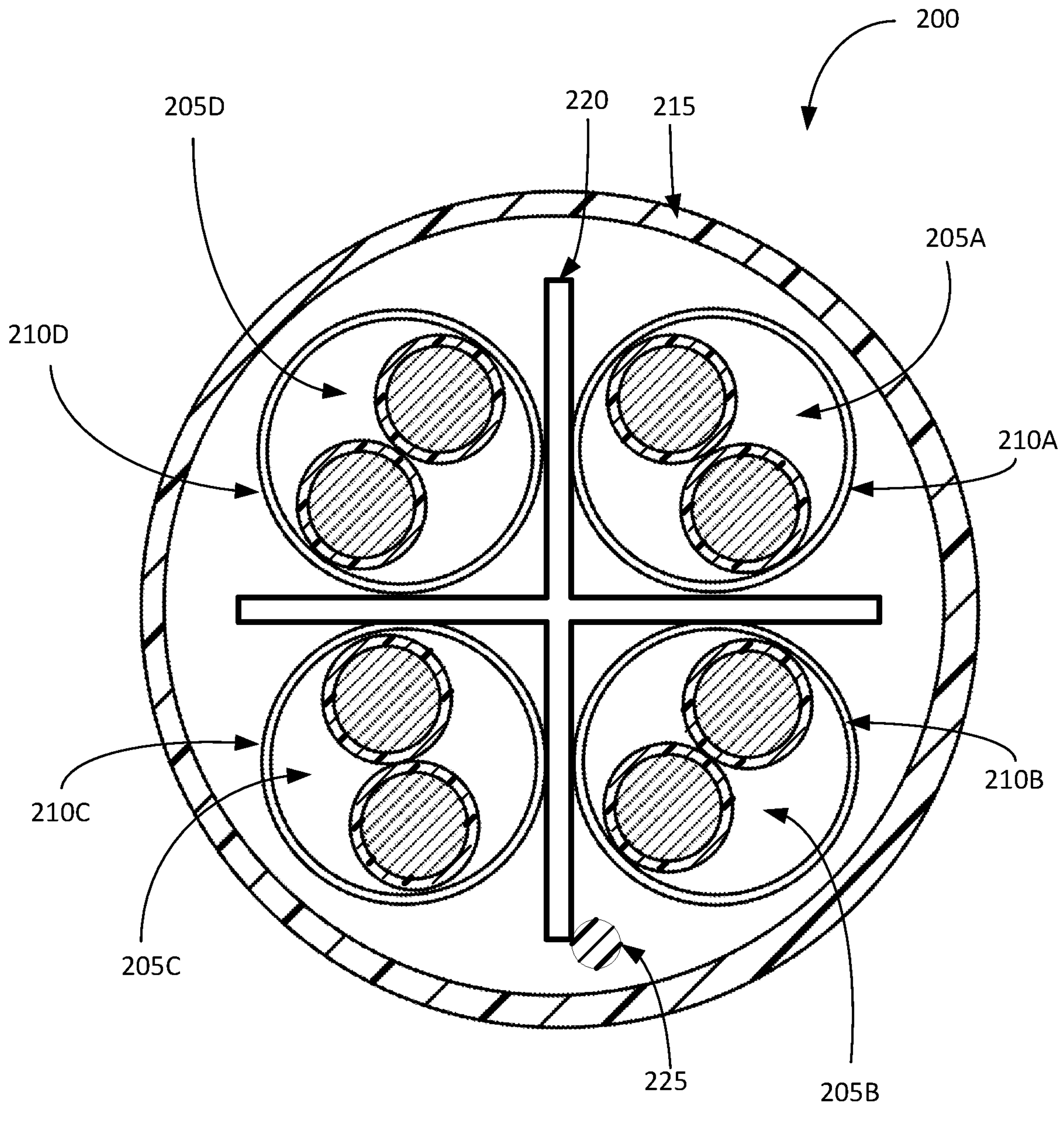
Figure 3:
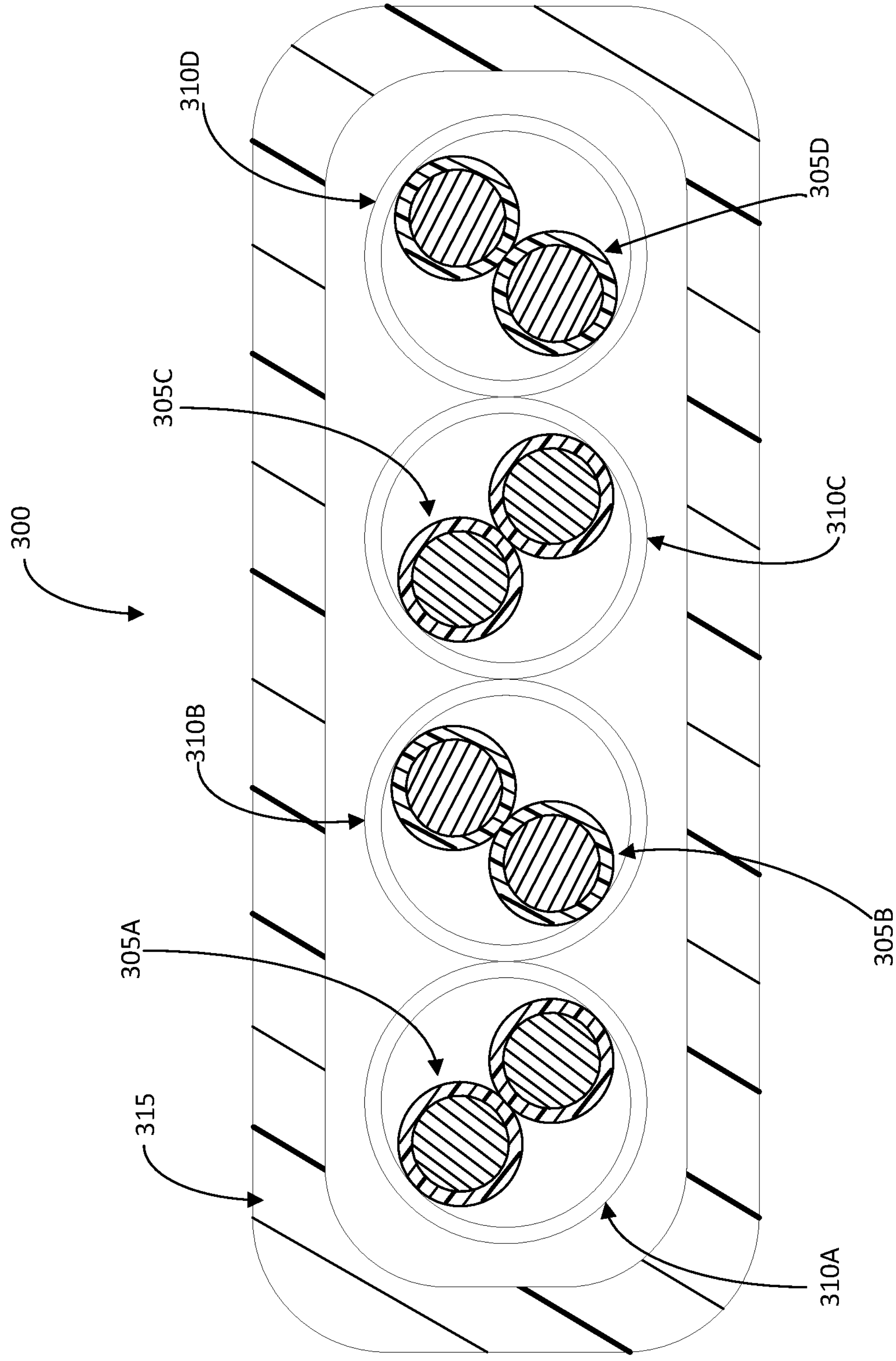

FIGS. 1-3 illustrate a few examples of twisted pair cables suitable for use in extended distance applications exceeding 100 m, according to various embodiments of the disclosure. As illustrated, the example cables may have a wide variety of suitable constructions with different cross-sectional shapes and components. Each of the cables may include a plurality of twisted pairs and individual shield layers formed around each of the twisted pairs. Additionally, as explained in greater detail below, the twist lays of the pairs may be selected and/or optimized to facilitate extended distance performance while reducing propagation delay and delay skew. A wide variety of optional components may be incorporated into a cable as desired, such as separators, additional shielding elements, pulling elements, heat dissipation elements, ripcords, strength members, etc. The cable components illustrated in any of the cables of FIGS. 1-3, as well as other suitable configurations or constructions described herein, may be combined in any suitable manner in other embodiments of the disclosure. Indeed, the cables illustrated in FIGS. 1-3 are provided by way of non-limiting example only.

The example cables of FIGS. 1-3 may be suitable for use in a wide variety of applications including, but not limited to, indoor, outdoor, plenum, and/or riser applications. In certain embodiments, the cables may be suitable for use in Category cabling applications, such as Category 5, Category 5e, Category 6, Category 6A, or Category 8 application. In other embodiments, the cables may be suitable for use in Power over Ethernet ("PoE") applications. In other embodiments, a cable may be suitable for use in both a PoE and a Category cabling application. An intended application for a cable may be defined by one or more suitable industry standards, such as the ANSI/TIA 568.2-D standard or an Institute for Electrical and Electronic Engineers ("IEEE") Power over Ethernet Standard (e.g., IEEE 802.3af, IEEE 802.3at, IEEE 802.3bt, etc.). Additionally, a cable 100 may be suitable for use at a wide variety of suitable distances or longitudinal lengths, such as extended longitudinal lengths of more than 100 m. Certain aspects of a cable, such as the sizes used for various conductors, the twist lays of the twisted pairs, and/or the shielding layers may be engineered such that the cable can satisfy performance requirements associated with one or more applicable industry standards and/or performance requirements associated with a desired cable application.

Turning first to FIG. 1, a cross-section of a first example twisted pair cable 100 that may be utilized for extended distance applications is illustrated. As shown in FIG. 1, the cable 100 may include a plurality of twisted pairs 105A-D of individually insulated conductors, a plurality of shield layers 110A-D with each shield layer individually formed around a respective twisted pair 105A-D. and a jacket 115 formed around the twisted pairs 105A-D and the shield layers 110A. A wide variety of other components may optionally be incorporated into the cable 100 as desired in various embodiments, such as a separator, one or more additionally shielding elements (e.g., an overall shield, etc.), one or more pulling elements, one or more strength elements, one or more heat dissipation elements, one or more rip cords, one or more drain wires, etc. Certain optional components that may be incorporated into the cable 100 are described in greater detail below and illustrated with reference to the example cable 300 of FIG. 3. Each of the components of the cable 100 will now be described in greater detail.

According to an aspect of the disclosure, the cable 100 may include a plurality of twisted pairs of individually insulated conductors. In particular, the cable 100 may include at least four twisted pairs. As shown in FIG. 1, the cable 100 may include four twisted pairs 105A, 105B, 105C, 105D; however, other suitable numbers of pairs may be utilized in other embodiments. In certain embodiments, the cable 100 may include only four twisted pairs of individually insulated conductors 105A-D configured to transmit data and/or power signals and no other transmission media configured to transmit data and/or power signals. For example, the cable 100 may include four pairs 105A-D, one or more optional components that are not configured to be used to transmit data and/or power signals (e.g., one or more pulling elements, one or more rip cords, one or more drain wires, etc.), and no other conductive components that are suitable for transmitting communications and/or power signals. In other embodiments, the cable 100 may include four pairs 105A-D and any other number of components configured to transmit data and/or power signals, such as one or more additional twisted pairs, one or more optical fibers, one or more coaxial cables, one or more power conductors, etc. In yet other embodiments, the cable 100 may include four pairs 105A-D and one or more optional components (e.g., a pulling element, a heat dissipation element, etc.) that are configured to transmit power and/or data signals.

Each twisted pair (referred to generally as twisted pair 105) may include two electrical conductors, each covered with respective insulation. The electrical conductors of a twisted pair 105 may be formed from any suitable electrically conductive material, such as copper, aluminum, silver, annealed copper, gold, a conductive alloy, etc. In certain embodiments, the conductors of a twisted pair 105 may be formed from an electrically conductive material having a resistivity less than or equal to $3 \cdot 10^{-8}$ Ω·m at 20° C. Additionally, the electrical conductors of each twisted pair 105 may have any suitable diameter, gauge, and/or other dimensions. In certain embodiments, the conductors of a twisted pair 105 may have diameters between approximately 0.5 mm and 1.3 mm. For example, a twisted pair 105 may include conductors that are sized between 24 AWG and 16 AWG. For extended distance applications, larger conductors may facilitate enhanced transmission of signals and/or may reduce signal attenuation. Thus, in certain embodiments, the conductors of a twisted pair 105 may have diameters between approximately 0.64 mm and 1.3 mm or conductors that are sized between 22 AWG and 16 AWG. In certain embodiments, the electrical conductors of each twisted pair 105A-D may be sized in accordance with a desired application for the cable 100 taking into account, for example, power transmission requirements, data requirements, and/or a longitudinal length of a cable run. Moreover, in certain embodiments, each of the twisted pairs 105A-D may include conductors having approximately equal or similar diameters or sizes. In other embodiments, at least two of the twisted pairs 105A-D may be formed with different diameters or sizes. Further, each of the electrical conductors incorporated into the twisted pairs 105A-D may be formed as either a solid conductor or as a conductor that includes a plurality of conductive strands that are twisted together.

In certain embodiments, the electrical conductors of all or a subset of the twisted pairs 105A-D may be capable of transmitting a desired power signal for PoE applications, such as a desired power signal established by the IEEE 802.3bt Type 4 "4PPoE"/"PoE++" Standard published by the Institute of Electrical and Electronics Engineers ("IEEE"). For example, a desired number of twisted pairs (e.g., the illustrated four twisted pairs 105A-D, etc.) may be capable of transmitting at least approximately 100 Watts of power at approximately 1.0 ampere per pair over desired longitudinal distance (e.g., 100 m, 125 m, 150 m, etc.). In certain embodiments, the twisted pairs may be capable of transmitting a power signal at a desired efficiency, such as at least approximately 80, 82, 85, or 88% efficiency at a temperature of approximately twenty degrees Celsius (20° C.). In certain embodiments, each example twisted pair 105 may be capable of transmitting a desired portion of the overall power. Additionally, each twisted pair 105 may be configured to carry data or some other form of information, for example in a range of about one to ten Giga bits per second ("Gbps") or other suitable data rates, whether higher or lower. In certain embodiments, each twisted pair 105 may support data transmission of about two and one-half Gbps (e.g. nominally two and one-half Gbps), with the cable 100 supporting about ten Gbps (e.g. nominally ten Gbps). In certain embodiments, each twisted pair 105 may support data transmission of up to about ten Gbps (e.g. nominally ten Gbps), with the cable 100 supporting about forty Gbps (e.g. nominally forty Gbps). Other suitable data transmission capabilities may be utilized as desired in other embodiments.

The twisted pair insulation may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, perfluoroalkoxy alkane ("PFA"), ethylene tetrafluoroethylene ("ETFE"), ethylene chlorotrifluoroethylene ("ECTFE"), etc.), or a combination of any of the above materials. In certain embodiments, the twisted pair insulation may be formed from a polymer having a dielectric constant less than or equal to 3.0 at 1 MHz and a dissipation factor less than or equal to $10 \cdot 10^{-4}$ at 1 MHz. Additionally, in certain embodiments, the insulation of each of the electrical conductors utilized in the twisted pairs 105A-D may be formed from similar materials or from the same materials. With twisted pairs 105A-D having similar twist lays, it may be preferable to utilize the same insulation material(s) for each of the pairs 105A-D. In other embodiments, at least two of the twisted pairs may utilize different insulation materials. In yet other embodiments, the two conductors that make up a twisted pair 105 may utilize different insulation materials. As desired in certain embodiments, insulation may additionally include a wide variety of other materials (e.g., filler materials, materials compounded or mixed with a base insulation material, etc.), such as smoke suppressant materials, flame retardant materials, etc.

In various embodiments, twisted pair insulation may be formed from one or multiple layers of insulation material. A layer of insulation may be formed as solid insulation, unfoamed insulation, foamed or cellular insulation, or other suitable insulation. As desired, a combination of different types of insulation may be utilized. For example, a foamed insulation layer may be covered with a solid foam skin layer. Additionally, the twisted pair insulation 125 may be formed with any suitable thickness, inner diameter, outer diameter, and/or other dimensions.

According to an aspect of the disclosure, the nominal twist lay lengths of each of the twisted pairs 105A-D may be optimized to reduce the propagation delay and/or delay skew at extended distances exceeded 100 m. For example, each of the twisted pairs 105A-D may have a relatively long nominal twist lay to reduce propagation delay over extended distances. In certain embodiments, each of the twisted pairs 105A-D may have a nominal twist lay of at least approximately 15.0 mm. In other embodiments, each of the twisted pairs 105A-D may have a nominal twist lay of at least approximately 25.0 mm. In various embodiments, each of the twisted pairs 105A-D may have a nominal twist lay of at least 15.0, 17.5, 20.0, 22.5, 25.0, 27.5, or 30.0 mm, or a nominal twist lay included in a range between any two of the above values. These relatively long nominal twist lays exceed those commonly used for Category cables suitable for more sophisticated electronic applications, such as Category 5, 5e, 6, and 6A cables. The tighter twist lays used in conventional cables result in signals having to be transmitted greater distances as more twists lead to longer conductor lengths. Thus, conventional cables have higher propagation delays, and the longer nominal twist lays utilized by the inventive cables may reduce propagation delays-especially over extended distances. In certain embodiments, the nominal twist lays of the twisted pairs 105A-D may account for a desired installation distance of the cable 100. For example, the nominal twist lays may be selected and optimized to facilitate installation lengths exceeding 100 m. In various embodiments, the twist lays may be selected or optimized to facilitate installation lengths of up to 300 m, such as installation lengths of 150, 200, 250, or 300 m, installation lengths included in a range between any two of the above values, or installation lengths included in a range bounded on a maximum end by one of the above values.

In certain embodiments, the respective nominal twist lays of each of the twisted pairs 105A-D may be similar to one another, relatively close to one another, or approximately equal. In this regard, the delay skew may be reduced, minimized, and/or optimized. In certain embodiments, a difference between the respective nominal twist lays of any two of the twisted pairs 105A-D may be no more than approximately 5.0 mm. In other embodiments, a difference between the respective nominal twist lays of any two of the twisted pairs 105A-D may be no more than approximately 2.5, 3.0, 4.0, 5.0, 7.5, or 10.0 mm, or a number included in a range between any two of the above values. A few example nominal twist lays are illustrated and described in greater detail below with reference to FIG. 4A.

Although the relatively long and similar nominal twist lays reduce propagation delay and delay skew, they may be more prone to electromagnetic interference ("EMI") and crosstalk. As explained in greater detail below, individual shield layers 110A-D formed around the pairs 105A-D may reduce crosstalk, noise, and interference along a longitudinal length of the cable 100, thereby permitting the cable to satisfy desired electrical performance requirements. However, the long and similar twist lays may also have a higher probability of crosstalk near termination points or connectors positioned on either end of the cable 100. For example, small longitudinal portions of the shields 110A-D may be removed near each end of the cable 100 to facilitate termination either in production of preconnectorized cables or in the field by a technician.

In certain embodiments, to reduce crosstalk and noise at or near the connectors or termination points of the cable 100, the respective twisted pairs 105A-D may each have a tighter twist lay (relative to its nominal twist lay) within relatively small termination areas positioned at opposite ends of the cable 100. For example, each twisted pair 105 may have a respective first termination area positioned at one end of the cable 100 and a respective second termination area positioned at an opposite end of the cable 100. The first and second termination areas may each have relatively short longitudinal lengths, such as lengths that are less than approximately 15.0 cm (about 5.9 inches). In certain embodiments, the termination areas may have longitudinal lengths of approximately 2.5 cm (1 inch), 7.62 cm (3 inches), or 12.7 cm (5 inches), or a longitudinal length incorporated into a range between any two of the above values. To terminate the cable 100 at a connector (either during manufacture for preconnectorized cables or in the field during installation), the individual shields 110A-D may be removed from the termination areas. Each of the twisted pairs 105A-D may have a tighter twist lay within their termination areas relative to their nominal twist lays to reduce crosstalk.

Further, in certain embodiments, each of the twisted pairs 105A-D may have a different twist lay within their respective termination areas. These different twist lays may assist in reducing cross-talk within the unshielded termination areas. However, given the short lengths of the termination area, they will have minimal impact on propagation delay and delay skew. A wide variety of suitable twist lays may be utilized within the termination areas provided that they include tighter twists than the nominal twist lays for the pairs. In certain embodiments, the twist lays within the termination areas may be similar to those utilized in conventional Category cables, such as conventional Category 6 or 6A cables. In certain embodiments, the twist lays utilized in the termination areas may be between approximately 0.26 inches and approximately 0.41 inches. For example, a first pair 105A may have a twist lay in a termination area between approximately 0.278 inches and approximately 0.282 inches; a second pair 105B may have a twist lay in a termination area between approximately 0.332 inches and approximately 0.336 inches; a third pair 105C may have a twist lay in a termination area between approximately 0.264 inches and approximately 0.268; and a fourth pair 105D may have a twist lay in a termination area between approximately 0.318 inches and approximately 0.322. A wide variety of other suitable twist lays may be utilized within the termination areas as desired in other embodiments. A few example twist lays that may be utilized in termination areas are illustrated and described in greater detail below with reference to FIG. 4A.

As a result of incorporating the unique cable constructions and twist lays described herein, a cable 100 may be utilized for extended distance applications exceeding 100 m while also reducing the propagation delay and/or delay skew of the cable. Propagation delay may be reduced as a result of the twisted pairs 105A-D having relatively long lay lengths, and delay skew may be reduced as a result of the twisted pairs 105A-D having similar law lengths. In certain embodiments, a delay skew between any two of the twisted pairs 105A-D (e.g., a difference in the propagation delay between any two of the twisted pairs along a longitudinal length of the cable, etc.) may be less than approximately 45 ns over the operating length of the cable 100 (i.e., over an extended distance greater than 100 m) at 20° C., 40° C., and 60° C. for the operating frequency range of the cable 100. For example, the delay skew between any two of the twisted pairs 105A-D may be less than approximately 45 ns over a frequency range between 1.0 MHz and 250 MHz. In certain embodiments, a delay skew between any two of the twisted pairs 105A-D may be less than approximately 45 ns over a frequency range between 1.0 MHz and 500 MHz. Additionally, a delay skew between any two of the pairs may be within 10 ns of the delay skew between any other two pairs included in the cable. Thus, a twisted pair cable formed in accordance with the present disclosure may be utilized to transmit data signals at relatively high frequencies over extended distances while minimizing propagation delays and skew. As a result, the cable 100 may be utilized in association with sophisticated electronic apparatus over extended distances. For example, the cable 100 may be utilized in extended distance applications while still satisfying the electrical requirements of one or more suitable standards, such as a Category 6 or 6A cabling standard as set forth in ANSI/TIA-568.2-D published by the Telecommunications Industry Association.

As desired, the plurality of twisted pairs 105A-D may be twisted together with an overall twist or bunch. A wide variety of suitable overall twist lay or bunch lay may be utilized as desired. In certain embodiments, a relatively long bunch lay may be utilized in order to reduce propagation delay over extended distances. For example, the cable 100 may include an overall bunch lay greater than or equal to 100 mm (approximately 3.9 inches). As another example, the cable 100 may include an overall bunch lay greater than or equal to 125 mm (approximately 4.9 inches). In various embodiments, a bunch lay may be at least 100, 125, 150, 200, 250, 300, or 350 mm, or a lay included in a range between any two of the above values. Additionally, it will be appreciated that certain cables may be formed that do not include an overall twist or bunch lay. For example, cables having a circular cross-sectional shape (e.g., the cable 100, 200 illustrated in FIGS. 1 and 2) may optionally include an overall twist. However, a cable having a different cross-sectional shape, such as a flat cable including twisted pairs arranged in a parallel arrangement (e.g., the cable 300 of FIG. 3) may not include an overall twist or bunch lay.

In certain embodiments, the twisted pairs 105A-D may be twisted in the same direction (e.g., clockwise or counter-clockwise), and an overall twist or bunching may then be formed in the same direction as the twisted pairs 105A-D (which tends to tighten the twist lays of each pair) or, alternatively, in an opposite direction from the twisted pairs (which tends to loosen the twist lays of each pair). One example of twist lay and bunch lay directions having the same direction is described in greater detail below with reference to FIG. 4B. In other embodiments, a first portion of the twisted pairs 105A-D may have a twist direction that is the same as the overall twist direction while a second portion of the twisted pairs 105A-D may have a twist direction that is opposite that of the overall twist direction. Any number of twisted pairs may be included in either the first portion or the second portion. Indeed, a wide variety of suitable combinations of twist directions may be utilized as desired in order to obtain twisted pairs with desired final nominal twist lays. As desired in various embodiments, one or more suitable bindings or wraps may be wrapped or otherwise formed around the twisted pairs 105A-D once they are twisted together.

With continued reference to FIG. 1, a plurality of shield layers and/or shielding elements may be incorporated into the cable 100. For example, an individual shielding element may respectively be provided for each of the twisted pairs 105A-D. As shown, an individual shield layer 110A-D may be formed around each of the twisted pairs 105A-D. For example, a first shield layer 110A may be formed around a first pair 105A; a second shield layer 110B may be formed around a second pair 105B; a third shield layer 110C may be formed around a third pair 105C; and a fourth shield layer 110D may be formed around a fourth pair 105D. The individual shield layers 110A-D may reduce crosstalk and noise that may negatively impact the electrical performance of the twisted pairs 105A-D. Each shield layer 110A-D may be formed or applied longitudinally or circumferentially along a longitudinal length of a corresponding twisted pair 105A-D in a manner that minimizes or eliminates gaps or spaces which may expose the pairs 105A-D electromagnetic interference, alien crosstalk, and/or internal noise or internal crosstalk caused by the other pairs.

Each individual shield layer (generally referred to as shield layer 110) may be formed with a wide variety of suitable shield designs and constructions. In certain embodiments, a shield layer 110 or shield may be formed from a single segment or portion that extends along a longitudinal length of the cable 100 (with the possible exception of termination areas). In other embodiments, a shield 110 may be formed from a plurality of discrete segments or portions positioned adjacent to one another along a longitudinal length of the cable 100, such as a plurality of segments in which longitudinally adjacent segments overlap one another. As desired, a wide variety of suitable techniques and/or processes may be utilized to form a shield 110 (or a shield segment). For example, a shield 110 may be formed from continuous electrically conductive material (e.g., an aluminum foil layer, a copper foil layer, etc.) or continuous layers of electrically conductive material. As another example, a base material or dielectric material may be extruded, pultruded, or otherwise formed. Electrically conductive material or other shielding material may then be applied to the base material. In other embodiments, dielectric material may be formed or extruded over shielding material in order to form a shield 110.

In certain embodiments, a shield 110 (or individual shield segments) may be formed as a tape that includes both a dielectric layer and an electrically conductive layer (e.g., copper, aluminum, silver, an alloy, etc.) formed on one or both sides of the dielectric layer. Examples of suitable materials that may be used to form a dielectric layer include, but are not limited to, various plastics, one or more polymeric materials, one or more polyolefins (e.g., polyethylene, polypropylene, etc.), polyethylene terephthalate ("PET"), mylar, one or more fluoropolymers (e.g., fluorinated ethylene propylene ("FEP"), polyester, polytetrafluoroethylene, polyimide, or some other polymer, combination of polymers, aramid materials, or dielectric material(s) that does not ordinarily conduct electricity. In certain embodiments, a separate dielectric layer and electrically conductive layer may be bonded, adhered, or otherwise joined (e.g., glued, etc.) together to form the shield 110. In other embodiments, electrically conductive material may be formed on a dielectric layer via any number of suitable techniques, such as the application of metallic ink or paint, liquid metal deposition, welding, heat fusion, etc. In certain embodiments, the electrically conductive (or other shielding material) can be over-coated with an insulating film. Additionally, in certain embodiments, an electrically conductive layer may be sandwiched between two dielectric layers. In other embodiments, at least two electrically conductive layers may be combined with any number of suitable dielectric layers to form the shield 110. For example, a four-layer construction may include respective electrically conductive layers formed on either side of a first dielectric layer. A second dielectric layer may then be formed on one of the electrically conductive layers to provide insulation between the electrically conductive layer and a twisted pair 105. Indeed, any number of suitable layers of material may be utilized in a shield 110. A few example shield constructions are described in greater detail below with reference to FIG. 5A-D.

A shield 110 that is formed as a tape may be longitudinally or circumferentially wrapped around a corresponding twisted pair 105 in a manner that eliminates gaps or spacings. For example, a shield 110 may be cigar wrapped around a corresponding pair 105. Additionally, in certain embodiments, a sufficient overlap may be formed by the widthwise edges of the shield 110 as it is wrapped to eliminate gaps and ensure that the twisted pair 105 is completely entrapped by the shielding material. The shield overlap integrity may be further enhanced by adhering, bonding, fusing, soldering, or otherwise joining the overlapping sections of the shield 110 together after it is wrapped around a pair 105.

A wide variety of suitable materials may be utilized to form the electrically conductive components or layers of a shield layer 110. Examples of suitable electrically conductive materials that may be utilized include, but are not limited to, metallic material (e.g., silver, copper, nickel, steel, iron, annealed copper, gold, aluminum, etc.), metallic alloys, conductive composite materials, etc. Indeed, suitable electrically conductive materials may include any material having an electrical resistivity of less than approximately $3\times10^{-8}$ ohm meters at approximately 20° C.

It has also been found that electrical performance of the twisted pairs 105A-D may be enhanced if a thickness of the electrically conductive material (e.g., aluminum, copper, etc.) or other shielding material incorporated into a shield 110 is at least approximately 0.0762 mm (approximately 3 mils), approximately 0.0889 mm (3.5 mils), or approximately 0.101 mm (4 mils). In various embodiments, a thickness of shielding material may be between approximately 0.0635 mm (2.5 mils) and approximately 0.127 mm (5 mils) or between approximately 0.0762 mm (3 mils) and approximately 0.127 mm (5 mils). These thicker shield layers help to mitigate crosstalk, noise, and EMI, thereby permitting the cable 100 to satisfy desired electrical performance parameters over extended distances even with the cable 100 including twisted pairs 105A-D having similar or equal nominal twist lays. In other embodiments, it may be possible to use thinner shielding material. For example, as desired, the shielding material may have a thickness of approximately 0.0127 mm (0.5 mils), 0.0254 mm (1 mil), 0.0381 mm (1.5 mils), 0.0508 mm (2 mils), 0.0635 mm (2.5 mils), 0.0762 mm (3 mils), 0.0889 mm (3.5 mils), 0.101 mm (4 mils), 0.1143 mm (4.5 mils), and 0.127 mm (5 mils), or a thickness included in a range between any two of the above values.

In certain embodiments, the electrically conductive (or other shielding) material incorporated into a shield 110 may be relatively continuous along a longitudinal length of a cable 100 (with the potential exception of the termination areas). For example, a relatively continuous foil shield may be utilized. In other embodiments, a shield 110 may be formed as a discontinuous shield element having a plurality of isolated patches of shielding material. For example, a plurality of discontinuous patches of electrically conductive material may be incorporated into the shield 110, and gaps or spaces may be present between adjacent patches in a longitudinal direction. A wide variety of different patch patterns may be formed as desired in various embodiments, and a patch pattern may include a period or definite step. Further, a wide variety of suitable patch lengths (e.g., lengths along a longitudinal direction) may be utilized. As desired, the dimensions of the segments and/or electrically conductive patches can be selected to provide electromagnetic shielding over a specific band of electromagnetic frequencies or above or below a designated frequency threshold. Individual patches may be separated from one another so that each patch is electrically isolated from the other patches. That is, the respective physical separations between the patches may impede the flow of electricity between adjacent patches. In certain embodiments, the physical separation of patches may be formed by gaps or spaces, such as gaps of dielectric material. In other embodiments, the physical separation of certain patches may result from the overlapping of shield segments. For example, a shield element may be formed from a plurality of discrete segments, and adjacent segments may overlap one another. The respective physical separations between the patches may impede the flow of electricity between adjacent patches. A wide variety of suitable gap distances or isolation gaps may be provided between adjacent patches. Additionally, in certain embodiments, patches may be formed as first patches (e.g., first patches on a first side of a dielectric material), and second patches may be formed on an opposite side of a dielectric base layer. For example, second patches may be formed to correspond with the gaps or isolation spaces between the first patches to further reduce EMI, crosstalk, and/or noise. As desired, patches may also have a wide variety of different shapes and/or orientations.

As desired, the cable 100 may include a wide variety of other shielding elements in addition to the individual pair shields 110A-D. For example, the cable 100 may include an overall shield layer formed around the plurality of shielded twisted pairs 105A-D. As another example, the cable 100 may include one or more shields formed around groups or subsets of the shielded twisted pairs 105A-D. In yet other embodiments, shielding material may be incorporated into cable separators or fillers, into a cable jacket 115, and/or into other cable components. Indeed, a wide variety of suitable shielding configurations, shield elements, and/or combinations of shield elements may be utilized.

With continued reference to FIG. 1, a jacket 115 may enclose the internal components of the cable 100, seal the cable 100 from the environment, and/or provide strength and structural support. The jacket 115 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, chlorosulphonated polyethylene, flame retardant PVC, low temperature oil resistant PVC, flame retardant polyurethane, flexible PVC, or a combination of any of the above materials. The jacket 115 may be formed as a single layer or, alternatively, as multiple layers. In certain embodiments, the jacket 115 may be formed from one or more layers of foamed material. As desired, the jacket 115 can include flame retardant and/or smoke suppressant materials. As shown, the jacket 115 may be formed to result in a round cable or a cable having an approximately circular cross-section; however, the jacket 115 and internal components may be formed to result in other desired shapes, such as a relatively flat shape (as shown in FIG. 3), an elliptical, oval, or rectangular shape. In various embodiments, the jacket 115 can be characterized as an outer jacket, an outer sheath, a casing, a circumferential cover, or a shell.

The jacket 115 may also have a wide variety of suitable dimensions, such as any suitable or desirable outer diameter and/or any suitable or desirable wall thickness. In certain embodiments, the cable 100 may be formed with a relatively small outside or outer diameter. In this regard, the cable 100 may be routed through and/or installed in relatively small spaces. For example, the cable 100 may have an outside diameter that is less than or equal to approximately 10 mm (0.393 inches). Other suitable outside diameters may be utilized as desired in various embodiments, such as an outside diameter that is less than or equal to approximately 6, 7, 8, 9, 10, 11, 12, 13, or 15 mm, or an outside diameter included in a range between any two of the above values.

An opening enclosed by the jacket 115 may be referred to as a cable core, and the twisted pairs 105A-D, shield layers 110A-D, and/or other cable components may be disposed within the cable core. Although a single cable core is illustrated in the cable 100 of FIG. 1, a cable may be formed to include multiple cable cores. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the shielded twisted pairs 105A-D and/or other internal cable components. Other elements can be added to the cable core as desired depending upon application goals.

As desired in various embodiments, a wide variety of other suitable components may be incorporated into the cable 100. Examples of suitable components include, but are not limited to, a separator positioned between the plurality of twisted pairs 105A-D, one or more additional shielding elements (e.g., an overall shield, etc.), one or more pulling elements, one or more additional conductors (e.g., conductive pulling elements, heat dissipation elements, etc.), a rip cord, one or more drain wires, and/or other suitable components. A few example components, such as a separator, are described in greater detail below with reference to FIG. 2. It will be appreciated that these example components can be incorporated into the cable 100 of FIG. 1 in certain embodiments. As desired, a cable 100 may also include a wide variety of water blocking or water swellable materials, insulating materials, dielectric materials, flame retardants, flame suppressants or extinguishants, gels, and/or other materials. The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or materials than the components illustrated in FIG. 1.

FIG. 2 illustrates a cross-sectional view of a second example cable 200 that may be utilized for extended distance applications. As shown, the cable 200 may include a plurality of twisted pairs 205A-D of individually insulated conductors, a plurality of individual shield layers 210A-D respectively formed around the pairs 205A-D, and an outer jacket 215. Each of these components may be similar to those discussed above with reference to the cable 100 of FIG. 1. Additionally, the cable 200 may include a separator 220 positioned between the pairs 205A-D and any other additional components positioned within the cable core. This additional component may be a ripcord 225 (as shown in FIG. 2), drain wire, a pulling element, a heat dissipation element, an additional conductor, or another suitable transmission media.

With continued reference to FIG. 2, in certain embodiments, a suitable separator 220, spline, or filler may optionally be positioned between two or more of the twisted pairs 205A-D. The separator 220 may be disposed within the cable core and configured to orient and or position one or more of the twisted pairs 205A-D. The orientation of the twisted pairs 205A-D relative to one another may provide beneficial signal performance. As desired in various embodiments, the separator 220 may be formed in accordance with a wide variety of suitable dimensions, shapes, or designs. For example, the separator 220 may be formed as an X-shaped separator or cross-filler. In other embodiments, a rod-shaped separator, a flat tape separator, a flat separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. In certain embodiments, the separator 220 may be continuous along a longitudinal length of the cable 200. In other embodiments, the separator 220 may be non-continuous or discontinuous along a longitudinal length of the cable 200. In other words, the separator 220 may be separated, segmented, or severed in a longitudinal direction such that discrete sections or portions of the separator 220 are arranged longitudinally (e.g., end to end) along a length of the cable 200. Use of a non-continuous or segmented separator 220 may enhance the flexibility of the cable 200, reduce an amount of material incorporated into the cable 200, and/or reduce cost.

A wide variety of suitable techniques may be utilized to form a separator 220. For example, in certain embodiments, material may be extruded, cast, molded, or otherwise formed into a desired shape to form the separator 220. In other embodiments, various components of a separator 220 may be separately formed, and then the components of the separator 220 may be joined or otherwise attached together via adhesive, bonding (e.g., ultrasonic welding, etc.), or physical attachment elements (e.g., staples, pins, etc.). In yet other embodiments, a tape may be provided as a substantially flat separator 220 or formed into another desired shape utilizing a wide variety of folding and/or shaping techniques. For example, a relatively flat tape may be formed into an X-shape or cross-shape as a result of being passed through one or more dies. In other embodiments, a plurality of tapes may be combined in order to form a separator 220 having a desired cross-sectional shape. For example, two tapes may be folded at approximately ninety-degree angles and bonded together to form a cross-shaped separator 220. As another example, four tapes may be folded at approximately ninety-degree angles and bonded to one another to form a cross-shaped separator 220. A wide variety of other suitable construction techniques may be utilized as desired.

Additionally, in certain embodiments, a separator 220 may be formed to include one or more hollow cavities that may be filled with air or some other gas, one or more additional wires and/or pulling elements, moisture mitigation material, a drain wire, shielding, or some other appropriate components.

The separator 220 (and/or various segments, projections, and/or other components of the separator) may be formed from a wide variety of suitable materials and/or combinations of materials as desired in various embodiments. For example, the separator 220 may include paper, metallic material (e.g., aluminum, ferrite, etc.), alloys, semi-conductive materials, ferrite ceramic materials, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, chlorosulphonated polyethylene, flame retardant PVC, low temperature oil resistant PVC, flame retardant polyurethane, flexible PVC, or any other suitable material or combination of materials. As desired, the separator 220 may be filled, unfilled, foamed, solid, homogeneous, or inhomogeneous and may or may not include additives (e.g., flame retardant and/or smoke suppressant materials). In certain embodiments, a separator 220 may include or incorporate one or more shielding materials, such as electrically conductive shielding material, semi-conductive material, and/or dielectric shielding material (e.g., ferrite ceramic material, etc.). As a result of incorporating electrically conductive material, the separator 220 may function as a shielding element.

Additionally, in certain embodiments, one or more separator elements (not shown) may be positioned between the individual conductors of a twisted pair (generally referred to as twisted pair 205). As desired, shielding material may be optionally incorporated into one or more separator elements positioned between the conductors of respective twisted pairs 205A-D. In certain embodiments, a twisted pair separator may be woven helically with the individual conductors or conductive elements of an associated twisted pair 205. In other words, a separator element may be helically twisted with the conductors of a twisted pair 205 along a longitudinal length of the cable 200.

Each separator element may have a wide variety of suitable constructions, components, and/or cross-sectional shapes. For example, each separator may be formed as a dielectric film that is positioned between the two conductors of a twisted pair 205. In other embodiments, a separator may be formed with an H-shape, an X-shape, or any other suitable cross-sectional shape. For example, the separator may be formed to create or define one or more channels in which the twisted pair conductors may be situated. In this regard, the separator may assist in maintaining the positions of the twisted pair conductors when stresses are applied to the cable, such as pulling and bending stresses. Additionally, in certain embodiments, a separator may include a first portion positioned between the conductors of a twisted pair 205 and one or more second portions that form a shield around an outer circumference of the twisted pair. The first portion may be helically twisted between the conductors, and the second portion(s) may be helically twisted around the conductors as the separator and the pair 205 are twisted together. The first portion or dielectric portion may assist in maintaining spacing between the individual conductors of the twisted pair 205 and/or maintaining the positions of one or both of the individual conductors. The second portion(s) or shielding portions may extend from the first portion, and the second portion(s) may be individually and/or collectively wrapped around the twisted pair conductors to form a shield layer. In certain embodiments, the shields formed from separator elements may be used as an alternative to individual pair shields 120A-D as each separator shield will ultimately be wrapped around or formed around a respective twisted pair 205.

With continued reference to FIG. 2, in certain embodiments, one or more additional components 225 may be incorporated into the cable core. As shown in FIG. 2, the additional component 225 may be a ripcord that facilitates opening the cable jacket 215 in order to access the twisted pairs 205A-D and/or other desired internal components. A ripcord may be formed from a wide variety of suitable materials, such as nylon, aramid, polyester, or other specialty yarns. In other embodiments, one or more drain wires may be utilized as additional components. A drain wire may be utilized in conjunction with one or more shield layers 210A-D (e.g., shield layers having longitudinally continuous electrically conductive material) to ensure effective grounded when the cable 200 is terminated. A drain wire may be formed from a wide variety of suitable metallic materials (e.g., copper, steel, etc.) and may have any suitable gauge and/or other dimensions.

In other embodiments, an additional component 225 may constitute an additional cable wire and/or a pulling element. An additional wire or conductor may serve a wide variety of suitable purposes, such as transmission of signals (i.e., power, data, or a combination of power and data signals), dissipation of heat within the cable 200 or near devices connected to the cable, grounding or functioning as an electrical drain, and/or functioning as an element that allows an enhanced pulling force to be imparted on the cable 200. As desired in various embodiments, an additional wire 225 may be a bare uninsulated conductive wire or a wire that includes one or more layers of insulation. A wide variety of suitable types of insulation can be utilized, such as thermoplastic and/or thermoset insulation.

In certain embodiments, an additional wire may constitute a pulling element. For example, a pulling element may be formed from steel, titanium, another suitable metal, or a metal alloy. In other embodiments, a pulling element may be formed from dielectric materials (e.g., glass reinforced plastic, aramid, etc.) and/or semi-conductive materials (e.g., carbon fiber, etc.). In certain embodiments, a pulling element (e.g., a metallic pulling element, a dielectric pulling element, etc.) may be formed from a material having a higher elastic modulus than that of the copper (or other conductive material) utilized in the twisted pairs 205A-D. For example, a pulling element may be formed from a material having an elastic modulus greater than 125 GPa. In this regard, the pulling element or a combination of pulling elements may primarily bear the tensile load associated with pulling the cable 200. As a result, the cable 200 may be capable of withstanding greater pulling forces than those permitted by existing cabling standards. For example, the pulling element(s) may allow a cable 200 to withstand pulling forces greater than 110 Newtons, such as pulling forces of 330 N or greater. Thus, the cable 200 may be easily pulled and installed at extended longitudinal lengths greater than 100 m without the twisted pairs 205A-D being stretched or elongated.

An additional wire or pulling element may be formed with a wide variety of suitable dimensions, such as any suitable gauge or cross-sectional area. Further, an additional wire or pulling element may be formed from a single component or from a plurality of stranded components (e.g., helically stranded conductors, stranded dielectric yarns, etc.). As desired, any number of suitable additional wires and/or pulling elements may be incorporated into a cable 200. These additional components may be positioned at a wide variety of suitable locations within a cable 200, such between the shielded twisted pairs 205A-D and the cable jacket 215, in the interstitial space between the pairs 205A-D, embedded within a separator 220, and/or embedded within the jacket 215. Regardless of the positioning of one or more additional wires and/or pulling elements, in certain embodiments, these components may extend in a longitudinal direction parallel to the plurality of the twisted pairs 205A-D. In other words, the additional wire(s) and/or pulling element(s) may not be twisted or stranded with the twisted pairs 205A-D. In other embodiments, an additional wire or pulling element may be twisted or otherwise stranded with the plurality of twisted pairs 205A-D, for example, within an overall bunch.

A wide variety of other suitable components may be incorporated into the cable 200 of FIG. 2 as desired in other embodiments. It will be appreciated that any of the example components discussed for the various example cables illustrated in FIGS. 1 and 3 can be incorporated into the cable of FIG. 2. The cable 200 illustrated in FIG. 2 is provided by way of example only. Embodiments of the disclosure contemplate a wide variety of other cables and cable constructions. These other cables may include more or less components than the cable 200 illustrated in FIG. 2. Additionally, certain components may have different dimensions and/or materials than the components illustrated in FIG. 2.

FIG. 3 illustrates a cross-sectional view of a third example twisted pair cable 300 that may be utilized for extended distance applications. As shown, the cable 300 may include a plurality of twisted pairs 305A-D of individually insulated conductors. A plurality of individual shield layers 310A-D may be respectively formed around the twisted pairs 305A-D, and a jacket 315 may be formed around the twisted pairs 305A-D, shield layers 310A-D, and any other internal components of the cable 300. Each of these components may be similar to those discussed above with reference to the cable 100 of FIG. 1. Additionally, the cable 300 may optionally include a wide variety of other components as desired, such as a separator, one or more additional wires, one or more pulling elements, a drain wire, a ripcord, etc. These components may be similar to those described above with reference to FIG. 2.

However, the pairs 305A-D of the cable 300 may be arranged in a different configuration than that illustrated in FIGS. 1 and 2. In particular, the pairs 305A-D may be arranged parallel to one another in a row. As a result, the cable 300 may be formed as a relatively flat or elongated cable. It will be appreciated that the twisted pairs 305A-D of a cable 300 may be positioned in any suitable configuration as desired in various embodiments. Additionally, the jacket 315 may have a different cross-sectional shape than the jackets 115, 215 illustrated in FIGS. 2 and 3. As shown, the jacket 315 may have a flat elongated shape with relatively flat top and bottom sides. Further, the jacket 315 is illustrated as having a single cable core. In other embodiments, the jacket 315 may include a plurality of cable core, such as an individual core for each of the twisted pairs 305A-D. Further, in certain embodiments, on or more ridges or protrusions may extend from an inner surface of the jacket 305A-D at least partially between adjacent sets of twisted pairs, and the protrusions may function to maintain the positions of the twisted pairs 305A-D and/or to maintain desired separation distances between the twisted pairs 305A-D.

A wide variety of other suitable components may be incorporated into the cable 300 of FIG. 3 as desired in other embodiments. Indeed, any of the example components discussed for the various example cables illustrated in FIGS. 1 and 2 may be incorporated into the cable of FIG. 3. The cable 300 illustrated in FIG. 3 is provided by way of example only. Embodiments of the disclosure contemplate a wide variety of other cables and cable constructions. These other cables may include more or less components than the cable 300 illustrated in FIG. 3. Additionally, certain components may have different dimensions and/or materials than the components illustrated in FIG. 3.

FIG. 4 illustrates a plurality of conductors 400 that are twisted together to form a plurality of twisted pairs that may be utilized in various embodiments of the disclosure. A cable, such as any of the cables 100, 200, 300 illustrated in FIGS. 1-3, may include a plurality of twisted pairs. For example, four twisted pairs 405A-D may be formed from a plurality of conductors 400, and the twisted pairs 405A-D may be incorporated into a cable. Each twisted pair (generally referred to as twisted pair 405) may include two conductors that are twisted around each other or twined together in a suitable twist direction. The two conductors of a pair 405 may be twisted together with any suitable twist lay, which is the longitudinal length required for the two conductors to make a complete twist around one another.

Figure 4A:
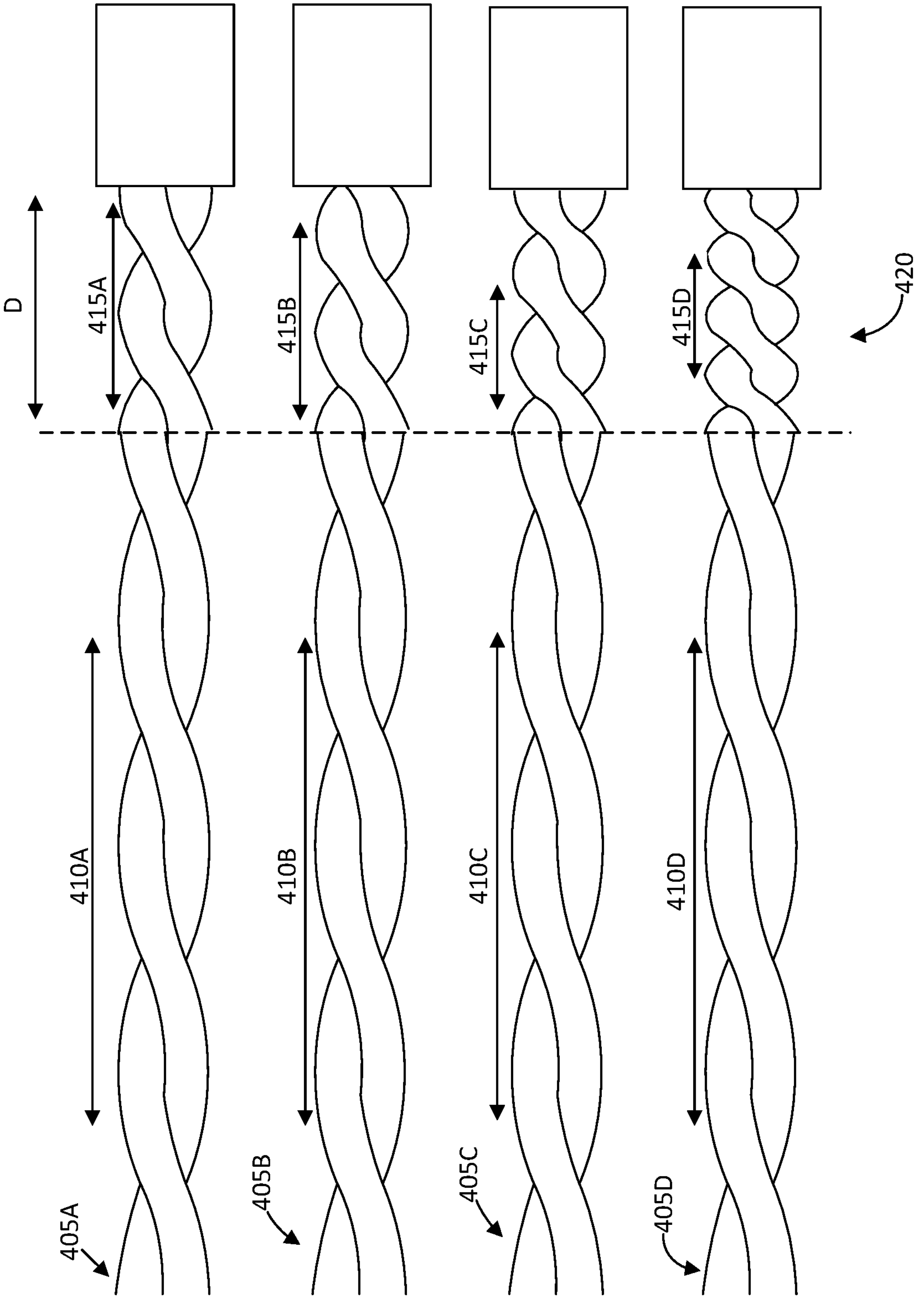
FIG. 4A illustrates example twist lays that may be utilized for a plurality of twisted pairs incorporated into a cable, according to an illustrative embodiment of the disclosure.

As shown in FIG. 4A, each of the twisted pairs 405A-D may have a respective nominal twist lay 410A-D along approximately its entire longitudinal length. For example, a first pair 405A may have a first nominal twist lay 410A; a second pair 405B may have a second nominal twist lay 410B, a third pair 410C may have a third nominal twist lay 410C; and a fourth pair 410D may have a fourth nominal twist lay. According to an aspect of the disclosure, the nominal twist lays 410A-D of the twisted pairs 405A-D may be optimized to reduce the propagation delay and/or delay skew at extended distances exceeded 100 m. For example, each of the nominal twist lays 410A-D may be at least approximately 15.0 mm or at least approximately 25.0 mm. In various embodiments, each of the nominal twist lays 410A-D may be at least 15.0, 17.5, 20.0, 22.5, 25.0, 27.5, or 30.0 mm, or a length included in a range between any two of the above values. These relatively long nominal twist lays exceed those commonly used for Category cables suitable for more sophisticated electronic applications, such as Category 5, 5e, 6, and 6A cables.

In certain embodiments, the respective nominal twist lays 410A-D of each of the twisted pairs 405A-D may be similar to one another, relatively close to one another, or approximately equal. In this regard, the delay skew may be reduced, minimized, and/or optimized. In certain embodiments, a difference between the respective nominal twist lays 410A-D of any two of the twisted pairs 405A-D may be no more than approximately 5.0 mm. In other embodiments, a difference between the respective nominal twist lays 410A-D of any two of the twisted pairs 405A-D may be no more than approximately 2.5, 3.0, 4.0, 5.0, 7.5, or 10.0 mm, or a number included in a range between any two of the above values.

With continued reference to FIG. 4A, in certain embodiments, to reduce crosstalk and noise at or near connectors or termination points for the twisted pairs 405A-D, the respective twisted pairs 405A-D may each have tighter twist lays (relative to its nominal twist lay) within relatively small termination areas positioned at opposite ends of a cable. An example termination area 420 is illustrated in FIG. 4A. The example termination area 420 could either be a first termination area positioned at a first end of a cable or a second termination area positioned at an opposite end of the cable. The termination area 420 may have a relatively short longitudinal length "D", such as a longitudinal length less than approximately 15.0 cm (about 5.9 inches). In certain embodiments, the termination areas 420 may have longitudinal length of approximately 2.5 cm (1 inch), 7.62 cm (3 inches), or 12.7 cm (5 inches), or a longitudinal length incorporated into a range between any two of the above values.

Within the termination area 420, each of the twisted pairs 405A-D may have tighter respective twist lay 415A-D relative to its nominal twist lay 410A-D. For example, a first pair 405A may have a tighter twist lay 415A within the termination area 420 relative to its nominal twist lay 410A and so on for the other pairs. Further, in certain embodiments, the tighter twist lays 415A-D of the pairs 405A-D may be similar in length within the termination area 420. In other embodiments, at least two of the twisted pairs 405A-D may have a different tighter twist lay within the termination area 420. For example, each of the twisted pairs 405A-D may have a different tighter twist lay 415A-D within the termination area 420. These different twist lays 415A-D may assist in reducing cross-talk within the unshielded termination areas. However, given the short length "D" of the termination area 4250, they will have minimal impact on propagation delay and delay skew. A wide variety of suitable tighter twist lays 415A-D may be utilized within a termination area 420 as desired. In certain embodiments, the twist lays 415A-D within a termination area 420 may be similar to those utilized in conventional Category cables, such as conventional Category 6 or 6A cables.

In certain embodiments, the twist lays 415A-D utilized in a termination area 420 may be between approximately 0.26 inches and approximately 0.41 inches. For example, a first pair 405A may have a twist lay 415A in a termination area 420 between approximately 0.278 inches and approximately 0.282 inches; a second pair 405B may have a twist lay 415B in a termination area 420 between approximately 0.332 inches and approximately 0.336 inches; a third pair 405C may have a twist lay 415C in a termination area 420 between approximately 0.264 inches and approximately 0.268 inches; and a fourth pair 405D may have a twist lay 415B in a termination area 420 between approximately 0.318 inches and approximately 0.322 inches. As another example, a first pair 405A may have a twist lay 415A in a termination area 420 between approximately 0.297 inches and approximately 0.301 inches; a second pair 405B may have a twist lay 415B in a termination area 420 between approximately 0.323 inches and approximately 0.327 inches; a third pair 405C may have a twist lay 415C in a termination area 420 between approximately 0.362 inches and approximately 0.366 inches; and a fourth pair 405D may have a twist lay 415B in a termination area 420 between approximately 0.390 inches and approximately 0.394 inches. A wide variety of other suitable twist lays may be utilized within the termination areas as desired in other embodiments.

Figure 4B:
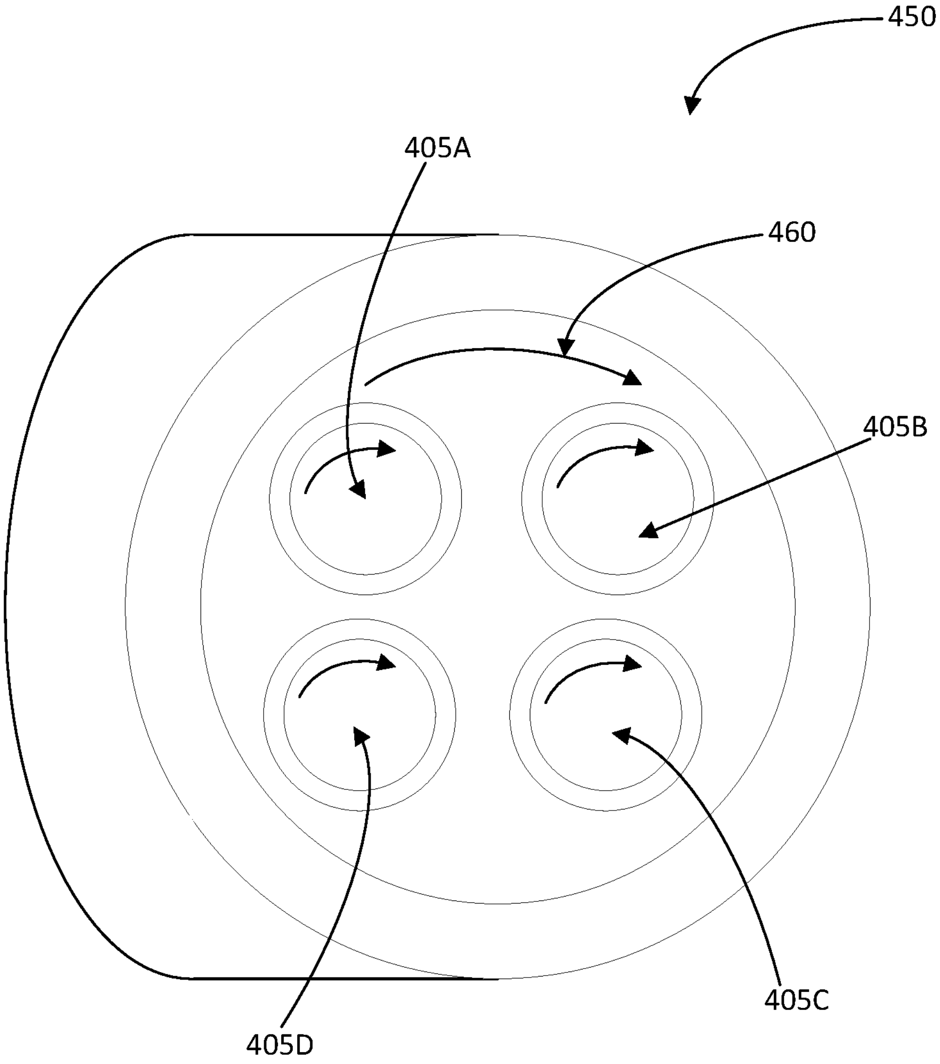
FIG. 4B is a cross-sectional view of example twist directions and an example overall bunch direction that may be utilized for a plurality of twisted pairs incorporated into a cable, according to an illustrative embodiment of the disclosure.

FIG. 4B illustrates an example cable core 450 in which a plurality of twisted pairs 405A-D (such as the pairs shown in FIG. 4A) are twisted together with an overall twist direction or bunch lay, according to illustrative embodiments of the disclosure. As shown, each of the twisted pairs 405A-D may be twisted in a similar direction, such as a clockwise direction. Additionally, the plurality of twisted pairs 405A-D may be twisted together in an overall twist direction 460 that matches that of each of the twisted pairs (i.e., the same direction). In other embodiments, one or more of the twisted pairs 405A-D may have a twist direction that is opposite that of the overall twist direction. With continued reference to FIG. 4B, each of the pairs 405A-D is illustrated as having an individual shield layer formed around it. In certain embodiments, a separator may be positioned between two or more of the plurality of twisted pairs 405A-D. Additionally, one or more wrap or sheath layers, such as an overall jacket layer may be formed around the plurality of twisted pairs 405A-D.

Figure 5A:
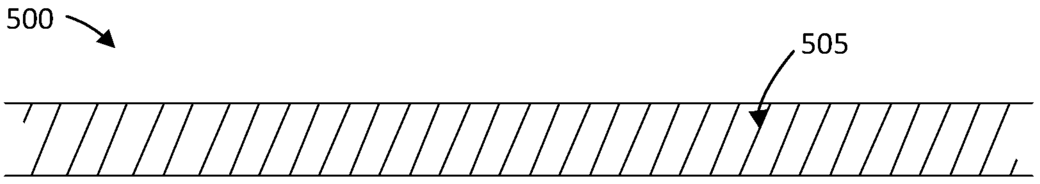
FIGS. 5A-5D are cross-sectional views of example shield layers that may be incorporated into a cable, according to an illustrative embodiment of the disclosure.
Figure 5B:
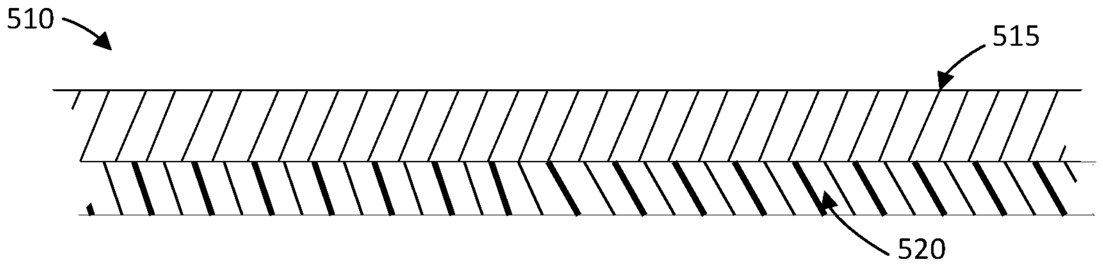
Figure 5C:
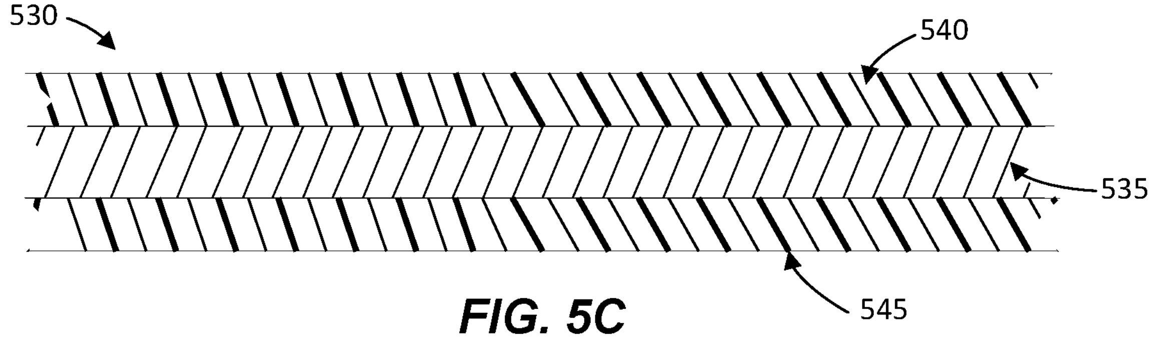
Figure 5D:
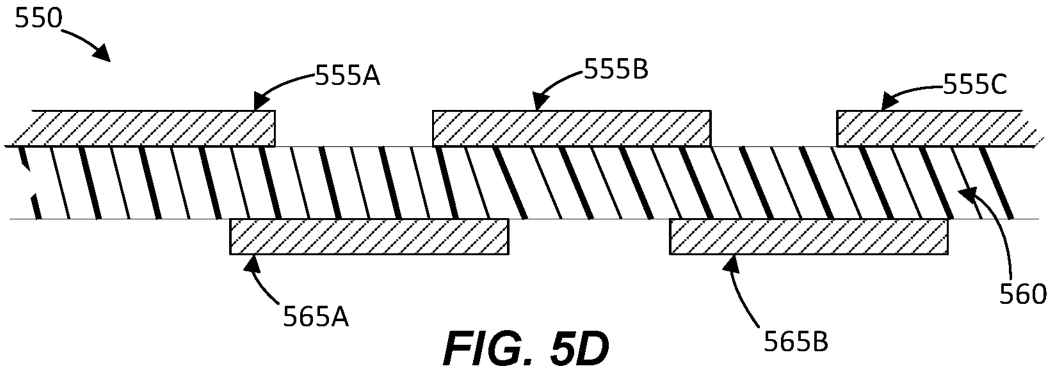

As set forth above, one or more shielding elements, may be incorporated into a cable. For example, an individual shield layer may be respectively formed around each twisted pair in a cable. A shield layer may be formed with any number of suitable layers of material and/or layer configurations. FIGS. 5A-6D illustrate cross-sectional views of example tapes or flexible structures that may be utilized to form certain shield elements (such as an individual shield layer), according to illustrative embodiments of the disclosure. FIG. 5A illustrates a first example shield 500 that includes electrically conductive material 505, such as a metallic foil or a combination of foil layers. FIG. 5B illustrates an example tape or flexible structure 510 that includes electrically conductive material 515 (or other shielding material) formed on a dielectric layer 510. FIG. 5C illustrates an example tape or flexible structure 530 in which electrically conductive material 535 (or other shielding material) is sandwiched between two dielectric layers 540, 545. FIG. 5D illustrates an example tape or flexible structure 550 in which discontinuous patches 555A-C of electrically conductive material (or other shielding material) may be formed in a longitudinal direction on a dielectric substrate layer 560. Gaps or spaces may exist between adjacent patches along a longitudinal length of the structure 550. As desired in certain embodiments, electrically conductive material may be formed on opposite sides of the dielectric layer 560. For example, the electrically conductive patches 555A-C described above may be first patches formed on a first surface or side of the dielectric layer 560. Then second patches 565A-B of electrically conductive material (or other shielding material) may be formed on an opposite surface or side of the dielectric layer 560. For example, second patches 565A-B may be formed on an opposite side of the dielectric layer 560 to cover gaps between adjacent patches formed on the first side. A wide variety of other constructions may be utilized as desired to form a shield element. Indeed, any number of dielectric, electrically conductive, shielding, and/or other layers may be utilized in a shielding element. The constructions illustrated in FIGS. 5A-5D are provided by way of example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable, comprising:

an outer jacket; and four twisted pairs of individually insulated conductors disposed within the outer jacket, each of the four twisted pairs having a respective nominal twist lay along a longitudinal length of the cable with the exception of a first termination area positioned at a first longitudinal end of the cable and a second termination area positioned at a second longitudinal end of the cable opposite the first termination area, each of the first and second termination areas occupying a longitudinal distance of 15.0 cm or less, wherein each of the four twisted pairs has a first twist lay within the first termination area that is smaller than its nominal twist lay, wherein each of the four twisted pairs has a second twist lay within the second termination area that is smaller than its nominal twist lay, and wherein the longitudinal length is greater than 100 m.

2. The cable of claim 1, wherein the first twist lay and the second twist lay for one of the four twisted pairs are equal.

3. The cable of claim 1, wherein each of the four twisted pairs has a different respective first twist lay within the first termination area and a different respective second twist lay within the second termination area.

4. The cable of claim 1, wherein the nominal twist lays for each of the four twisted pairs are equal.

5. The cable of claim 1, wherein a difference between the respective nominal twist lays of each of the four twisted pairs is no more than 5.0 mm.

6. The cable of claim 1, wherein the nominal twist lay for each of the four twisted pairs is at least 25.0 mm.

7. The cable of claim 1, wherein a delay skew between any two of the four twisted pairs is less than 45 ns over a frequency range between 1.0 MHz and 500 MHz.

8. The cable of claim 1, further comprising:

four individual twisted pair shield layers, each of the shield layers formed around a corresponding one of the four twisted pairs.

9. The cable of claim 8, wherein each of the shield layers comprises electrically conductive material having a thickness of at least 0.076 mm.

10. The cable of claim 1, wherein the four twisted pairs are twisted together with a bunch lay of at least 125 mm.

11. A cable, comprising:

four twisted pairs of individually insulated conductors, each of the four twisted pairs having a respective nominal twist lay along a longitudinal direction of the cable between a first termination area positioned at a first longitudinal end of the cable and a second termination area positioned at a second longitudinal end of the cable opposite the first termination area, wherein each of the first and second termination areas occupies a longitudinal distance of 15.0 cm or less, wherein each of the four twisted pairs has a first twist lay within the first termination area that is tighter than its nominal twist lay and a second twist lay within the second termination area that is tighter than its nominal twist lay, and wherein a longitudinal length of the cable is greater than 100 m.

12. The cable of claim 11, wherein each of the four twisted pairs has a different respective first twist lay within the first termination area and a different respective second twist lay within the second termination area.

13. The cable of claim 11, wherein the nominal twist lays for each of the four twisted pairs are equal.

14. The cable of claim 11, wherein a difference between the respective nominal twist lays of each of the four twisted pairs is no more than 5.0 mm.

15. The cable of claim 11, wherein the nominal twist lay for each of the four twisted pairs is at least 25.0 mm.

16. The cable of claim 11, wherein a delay skew between any two of the four twisted pairs is less than 45 ns over a frequency range between 1.0 MHz and 500 MHz.

17. The cable of claim 11, further comprising:

four individual twisted pair shield layers, each of the shield layers formed around a corresponding one of the four twisted pairs.

18. The cable of claim 17, wherein each of the shield layers comprises electrically conductive material having a thickness of at least 0.076 mm.

19. The cable of claim 11, wherein the four twisted pairs are twisted together with a bunch lay of at least 125 mm.

20. A cable, comprising:

four twisted pairs of individually insulated conductors, each of the four twisted pairs having a respective nominal twist lay of at least 25.0 mm along a longitudinal direction of the cable between a first termination area positioned at a first longitudinal end of the cable and a second termination area positioned at a second longitudinal end of the cable opposite the first termination area, each of the first and second termination areas occupying a longitudinal distance of 15.0 cm or less;

four individual twisted pair shield layers, each of the shield layers formed around a corresponding one of the four twisted pairs; and a jacket formed around the four twisted pairs and the four shield layers, wherein each of the four twisted pairs has a first twist lay within the first termination area that is tighter than its nominal twist lay and a second twist lay within the second termination area that is tighter than its nominal twist lay, and wherein a longitudinal length of the cable is greater than 100 m.

* * * * *